(12) United States Patent
Rahgozar

(10) Patent No.: US 8,077,423 B1
(45) Date of Patent: Dec. 13, 2011

(54) FLY-HEIGHT TOUCHDOWN DETECTION CIRCUITS AND METHODS

(75) Inventor: Parviz Rahgozar, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 164 days.

(21) Appl. No.: 12/265,434

(22) Filed: Nov. 5, 2008

Related U.S. Application Data

(60) Provisional application No. 60/987,920, filed on Nov. 14, 2007.

(51) Int. Cl.
*G11B 21/02* (2006.01)

(52) U.S. Cl. .......................................... 360/75

(58) Field of Classification Search .................. None
See application file for complete search history.

(56) References Cited

U.S. PATENT DOCUMENTS

| | | | |
|---|---|---|---|
| 6,384,994 B1 * | 5/2002 | Smith et al. ..................... | 360/25 |
| 7,660,068 B1 * | 2/2010 | Baumgart et al. ............. | 360/75 |
| 7,697,223 B2 * | 4/2010 | Eaton et al. ..................... | 360/31 |

* cited by examiner

*Primary Examiner* — K. Wong

(57) ABSTRACT

In one embodiment, the present invention includes an apparatus that includes a circuit that generates control information that controls a height of a read head of a disk drive. The circuit comprises a filter circuit and a detector circuit. The filter circuit receives a read channel signal from the read head and generates a filtered signal. The filtered signal ranges between 1.0 kHz and 500 kHz. The detector circuit receives the filtered signal and generates the control information when the filtered signal exceeds a defined threshold.

20 Claims, 4 Drawing Sheets

FLY-HEIGHT TOUCHDOWN DETECTION CIRCUITS AND METHODS

CROSS REFERENCE TO RELATED APPLICATIONS

This application is a non-provisional of and claims the benefit of priority from U.S. Provisional Application No. 60/987,920 filed Nov. 14, 2007, entitled "4-Channel Inductive Write Driver and TMR Read Preamplifier" the disclosure of which is hereby incorporated herein by reference.

BACKGROUND

The present invention relates to fly-height of a read head, and in particular, to fly-height touchdown detection circuits and methods.

Unless otherwise indicated herein, the approaches described in this section are not prior art to the claims in this application and are not admitted to be prior art by inclusion in this section.

Hard disk drives have increased in reliability and storage capacity. The read head fly-height influences the density at which the hard disk information may be read hack. The closer the read head is to the platter, the more information may be programmed per unit area of the platter surface. Also the closer the read head is to the platter, the more likely the read head may touchdown on the platter. The read head touchdowns may decrease the long term reliability of the hard disk drive.

A hard drive includes a head slider suspension assembly to place the read head above the hard disk drive. The platter surface of the hard disk is moving at a high rate of speed and the slider of the head slider assembly is hovering above the surface of the platter. A thin layer or air called an air bearing allows the slider to maintain a fly-height between the platter surface and the read head. The fly-height depends on the air pressure associated with the air bearing. Taking into account the required reliability for the hard disk drive, the tolerance of the fly-height restricts the possible hard disk drive capacity.

Thus, there is a need for improved hard disk drives. The present invention solves these and other problems by providing fly-height touchdown detection and circuits.

SUMMARY

Embodiments of the present invention improve fly-height touchdown detection circuits and methods. In one embodiment, the present invention includes an apparatus. The apparatus includes a circuit that generates control information that controls a height of a read head of a disk drive. The circuit comprises a filter circuit and a detector circuit. The filter circuit receives a read channel signal from the read head and generates a filtered signal. The filtered signal ranges between 10 kHz and 500 kHz. The detector circuit receives the filtered signal and generates the control information when the filtered signal exceeds a defined threshold.

In one embodiment, the filtered signal corresponds to a mechanical motion of the read head. The mechanical motion results from a touchdown of the read head.

In another embodiment, the filter circuit includes a high pass filter circuit coupled in series with a low pass filter circuit. The filter circuit passes a band of frequencies corresponding to an amplitude modulated signal of the read channel signal.

In another embodiment, the filter circuit is programmable and is programmed according to a signature of the read channel signal.

In one embodiment, the detector includes a programmable comparator which is programmed to set the defined threshold. The programmable comparator receives the filtered, signal and generates a digital signal corresponding to the defined threshold. The defined threshold is programmed according to a signature of the read channel signal corresponding to a motion of a head slider suspension assembly.

In another embodiment, the detector includes a digital circuit that receives the digital signal and generates the control information. The digital circuit diminishes portions of the digital signal which do not correspond to a touchdown of the read head.

In another embodiment, the detector includes a digital circuit that receives the digital signal and generates the control information. The digital circuit counts a number of transitions of the digital signal occurring in order to determine a touchdown of the read head.

In one embodiment, the present invention includes a system. The system comprises disk drive components, and an apparatus. The disk drive components include a read head and a platter having a surface. The apparatus includes a circuit that generates control information that controls a height between the read head and the surface of the platter. The circuit comprises a filter circuit and a detector circuit. The filter circuit receives a read channel signal from the read bead and generates a filtered signal. The filtered signal ranges between 10 and 500 kHz. The detector circuit receives the filtered signal and generates the control information when the filtered signal exceeds a defined threshold.

In one embodiment, the present invention includes a method for controlling a height of a read head of a disk drive. The method comprises filtering and generating. The filtering includes filtering a read channel signal from the read head. The filtering results in a filtered signal. The filtered signal ranges between 10 and 500 kHz. The generating includes generating control information when the filtered signal exceeds a defined threshold.

In another embodiment, the filtered signal corresponds to a mechanical motion of the read head. The mechanical motion results from a touchdown of the read head.

in yet another embodiment, the filtering includes a high pass filtering in series with low pass filtering. The filtering passes a band of frequencies corresponding to an amplitude modulated signal of the read channel signal.

In one embodiment, the filtering is programmable and is programmed according to a signature of the read channel signal.

In one embodiment of the present invention, the embodiment farther comprises comparing the filtered signal according to the defined threshold. The comparing results in a digital signal. The defined threshold is programmed according to a signature of the read channel signal corresponding to a motion of a head slider suspension assembly.

In another embodiment, the generating the control information includes diminishing, portions of the digital signal which do not correspond to a touchdown of the read head.

In one embodiment of the present invention, the embodiment further comprises adjusting the height of the read head according to the control information.

The following detailed description and accompanying drawings provide a better understanding of the nature and advantages of the present invention.

DETAILED DESCRIPTION

Described herein are techniques for differential hysteresis comparator circuits and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
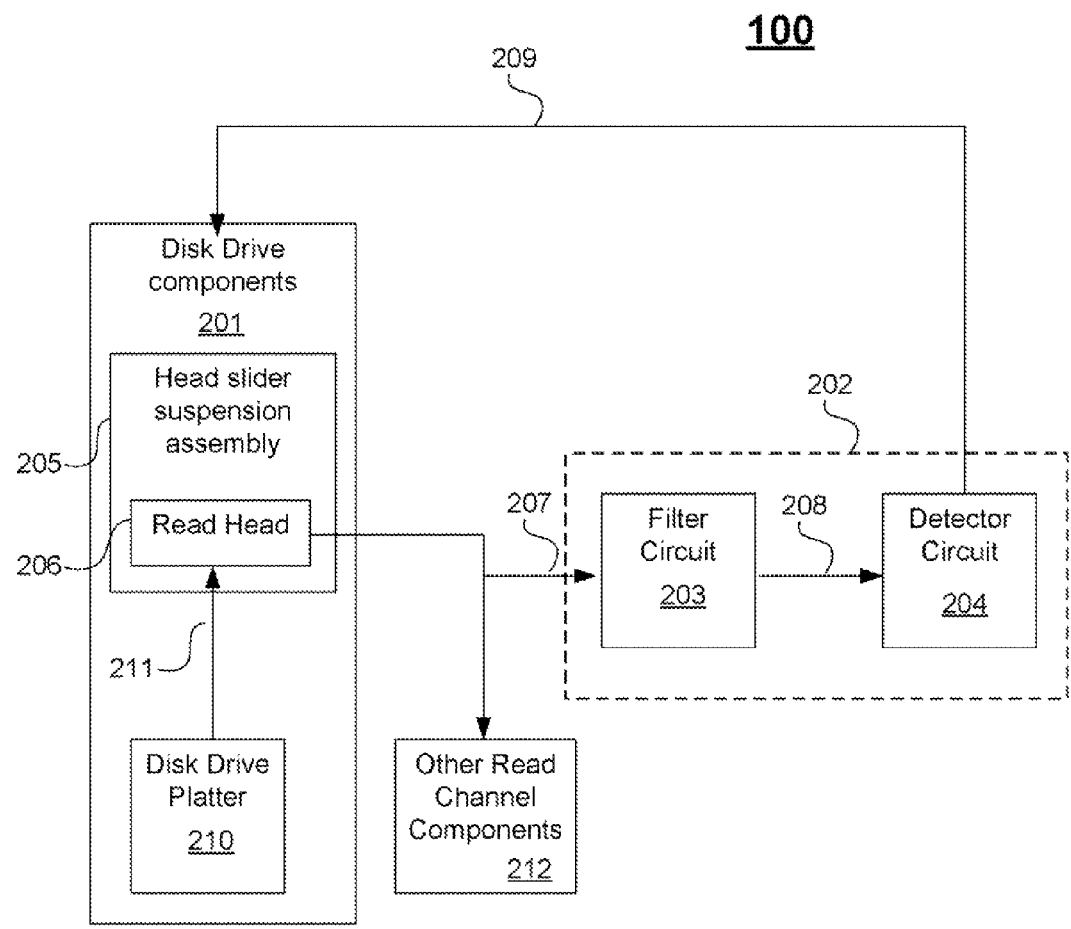
FIG. 1 illustrates a system for controlling a height between a read head and a platter of a hard disk drive.

FIG. 1 illustrates a system 100 for controlling a height between a read head 206 and a platter 210 of a hard disk drive. The system includes disk drive components 201, and a fly-height detection circuit 202. Hard disk drive components 201 include a head slider suspension assembly 205 and a platter 210. Head slider suspension assembly 205 includes read head 206. Read head 206 generates a read channel signal at 207 from the interface 211 between the read head 206 and the platter 210.

The read channel signal at 207 may contain data signals corresponding to data written on platter 210 and signals corresponding to the mechanical movement of the read head 206 relative to platter 210. The mechanical movement may be due to momentary touchdowns of the read head 206 to platter 210. The read channel signal is coupled to other read channel components 212 and is tapped off and received by fly-height detection circuit 202 at 207.

Fly-height detection circuit 202 includes filter circuit 203 and detector circuit 204. Filter circuit 203 receives the tapped off read channel signal and filters the read channel signal. The frequency response of filter circuit 203 corresponds to the frequency of a portion of the tapped off read channel signal which correspond to motion of the read head 206 relative to platter 210. The resulting filtered signal may include amplitude modulated signals. The resulting filtered signal may correspond to a touchdown of the read head 206 on platter 210 or a succession of touchdowns causing mechanical fluctuations.

The filtered signal at 208 may have a frequency ranging between 10 to 500 kHz. The frequency response of filter circuit 203 depends on the mechanical response of the hard drive components, and the platter when the read head comes into momentary contact with the platter. 500 kHz is an upper bound on the frequency according to an embodiment because of the limitation of the mechanical motion and other factors. 10 kHz is a lower bound on the frequency according to an embodiment because of the high speeds the platters are turning and other factors. The response of the filter circuit 203 may be programmable and tailored to the mechanical response. For example, the filter circuit 203 may be programmed according to a signature of the read channel signal when touchdowns occur.

Detector circuit 204 receives the filtered signal and generates a control signal at 209 to feed back to disk drive components 201. Detector circuit 204 may have a defined threshold in which the filtered signal needs to exceed, in order for the signal to register as a detection of a touchdown event. This threshold may also be programmed according to a signature of the read channel signal. For example, a mechanical response corresponding to a succession of touchdowns may have a frequency and a power translated to the read channel signal. A comparator may have a programmed threshold for detecting when the power of the filtered signal corresponds to the succession of touchdowns.

Detector circuit 204 may remove false triggers. For example, during power up, power down, or initialization of the hard drive, the read channel may contain signals resembling a touchdown which may produce false triggers. These false triggers may be removed by having an enabling or a muting of the detection circuit 202 during certain period of power up, power down, or initialization. The detection circuit may provide digital filtering which may perform a count N of the number of events which have been detected and use this information to determine if touchdown has occurred. This may prevent the control signal at 209 from reacting to events which do not correspond to touchdown events.

Figure 2:
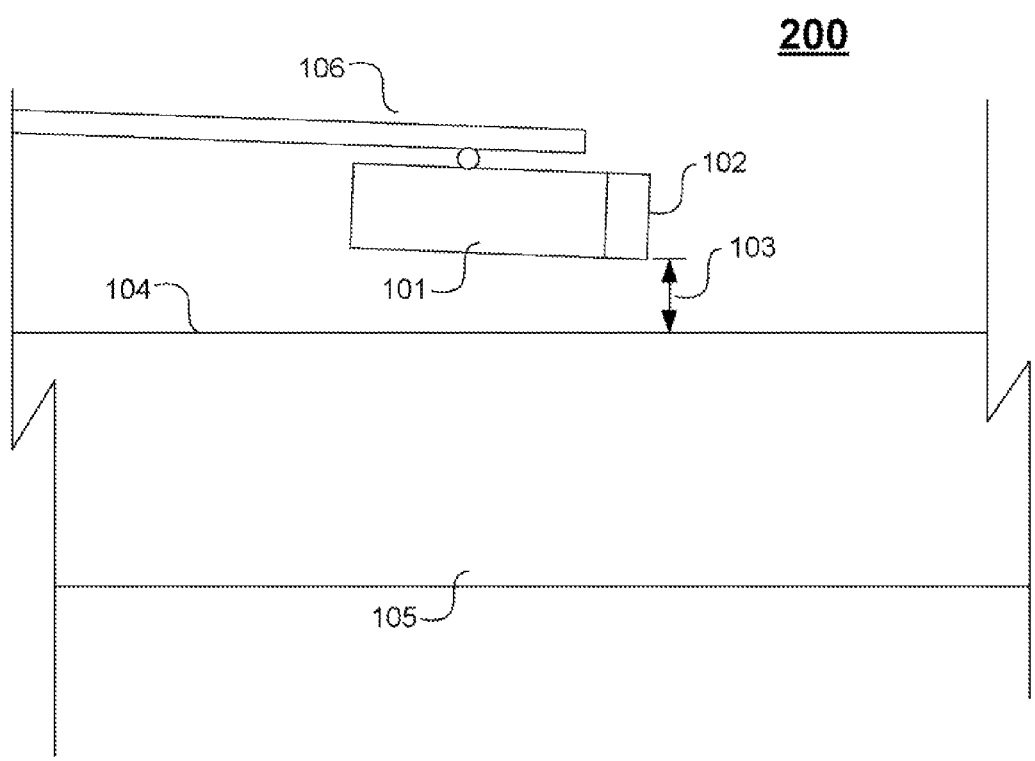
FIG. 2 illustrates a head slider suspension assembly of a hard disk drive.

FIG. 2 illustrates a head slider suspension assembly 200 of a hard disk drive. Head slider assembly 200 includes slider 101, read head 102, platter 105, and slider arm 106. Read head 102 maintains a fly-height 103 above a surface 104 of platter 105. Controlling the fly-height of the read head 102 more accurately allows for smaller fly-heights while maintaining an acceptable level of reliability that the read head 102 will not touchdown on platter surface 104. Lower fly-heights allow for increased hard disk drive capacity.

Figure 3:
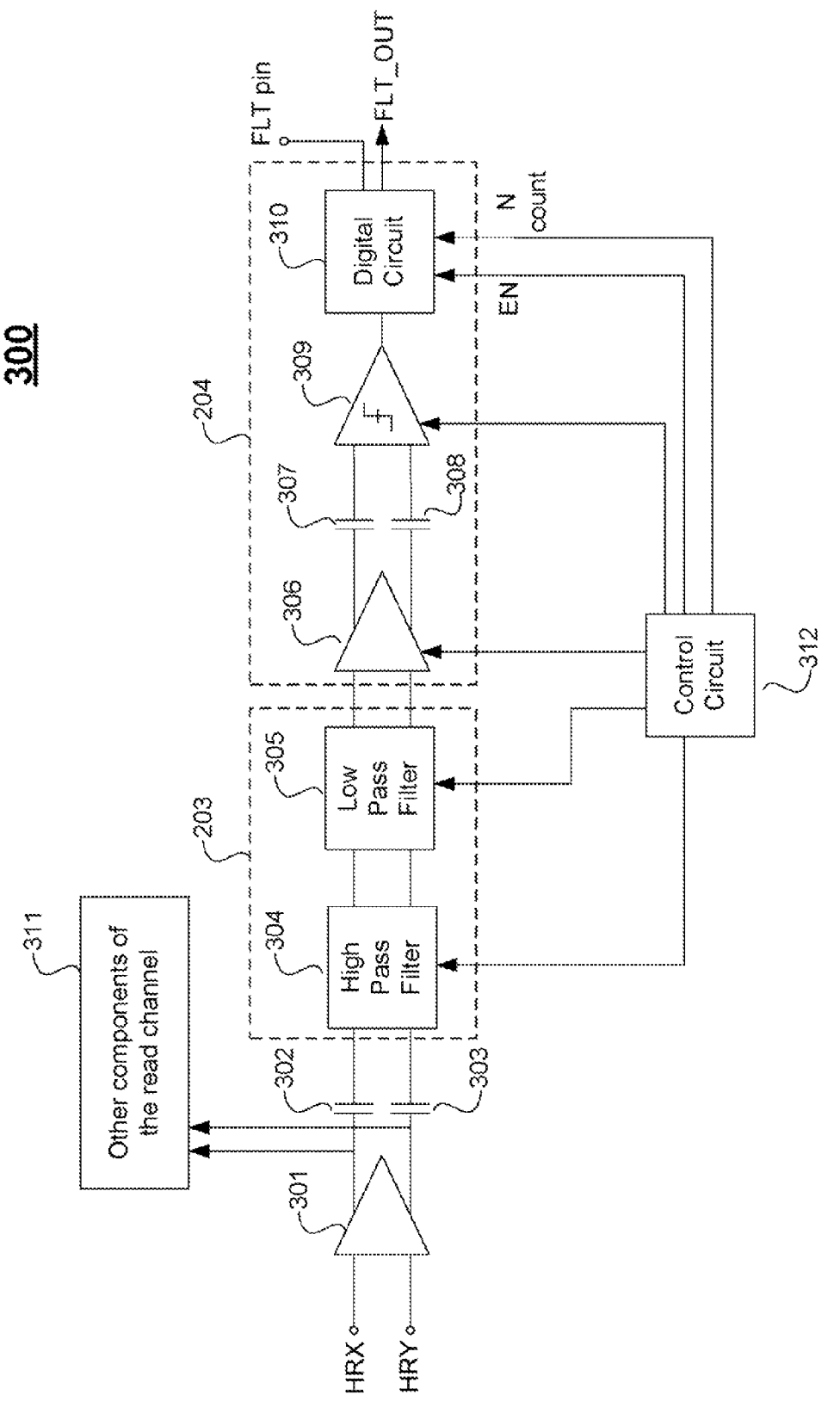
FIG. 3 illustrates a fly-height detection circuit according to another embodiment of the present invention.

FIG. 3 illustrates a fly-height detection circuit 300 according to another embodiment of the present invention. Fly-height detection circuit 300 includes an amplifier 301, capacitors 302-303, filter circuit 203, and detection circuit 204. HRX and HRY represent a read channel differential signal emanating from a read head. Amplifier 301 receives and amplifies the read channel signal and provides this signal to other components of the read channel 311. Capacitors 302 and 303 tap off the read channel signal and filter circuit 203 receives this read channel signal.

Filter circuit 203 receives the read, channel signal. Filter circuit 203 includes high pass filter circuit 304 coupled in series with low pass filter circuit 305. A separate high pass filter circuit 304 and low pass circuit 305 may form a band pass filter that filters out a band of frequencies corresponding to touchdowns of the read head on the platter. The separate high and low pass filter circuits may improve the accuracies of the overall frequency response and may facilitate the implementation of filter circuit 203 on an integrated circuit (IC). Filter circuit 203 may be coupled to control circuit 312 so that the high pass and low pass filter response may be programmed.

Detector circuit 204 receives the filtered signal from filter circuit 203. Detector circuit 204 includes amplifier 306, capacitors 307-308, comparator 309, and digital circuit 310. Amplifier 306 amplifies the filtered signal. This may be necessary to due to the attenuation caused by filter circuit 203. Capacitors 307 and 308 AC couple the amplified signal to comparator 309. Comparator 309 will trigger when the amplified, filtered signal exceeds a defined threshold corresponding to a touchdown. Amplifier 306 and comparator 309 may also be coupled to control circuit 312. Control circuit 312 may program the gain of amplifier 306, and may program the defined threshold of comparator 309.

Comparator 309 generates a digital signal which is received by digital circuit 310. Digital circuit 310 disregards false triggers by disabling the processing of the digital circuit and/or by counting N triggers (digital averaging) before determining that a touchdown occurs. The disabling of the processing may be due to trigger events which are generated when the system is powered up or is in another state which does not correspond to a touchdown event. Digital circuit 310 may output an indication of a touchdown event on FLT pin. Also, digital circuit 310 may output a signal FLT_OUT to change a register to indicate a touchdown event.

Controller 312 is coupled to enable (EN) and disable digital circuit 310 during the periods of time such as power up and power down, for example. Controller 312 may also provide digital circuit 310 with the number of N counts to wait before registering a touchdown event.

Table 1 below shows some example code conditions for high pass filter circuit 304, low pass filter circuit 305, amplifier 306, comparator 309, and digital circuit 310.

TABLE 1

Example Parameters for Fly-Height Detection Circuit 300

| Parameter | Symbol | Condition | Value | Units |
|---|---|---|---|---|
| Low Pass Filter (304) | LPF | 00 | 200 | kHz |
| | | 01 | 300 | kHz |
| | | 10 | 400 | kHz |
| | | 11 | 500 | kHz |
| High Pass Filter (305) | HPF | 00 | 10 | kHz |
| | | 01 | 16 | kHz |
| | | 10 | 38 | kHz |
| | | 11 | 90 | kHz |
| Gain (306) | GAIN | 000 | 73 | V/V |
| | | 001 | 146 | V/V |
| | | 010 | 292 | V/V |
| | | 011 | 584 | V/V |
| | | 100 | 182 | V/V |
| | | 101 | 364 | V/V |
| | | 110 | 728 | V/V |
| | | 111 | 1456 | V/V |
| Amplitude Detection Threshold (309) | VT | 000 | 37.5 | mV |
| | | 001 | 46.875 | mV |
| | | 010 | 56.25 | mV |
| | | 011 | 65.625 | mV |
| | | 100 | 75 | mV |
| | | 101 | 84.375 | mV |
| | | 110 | 93.75 | mV |
| | | 111 | 103.125 | mV |
| Digital Filtering (310) | N | 000 | 2 | count |
| | | 001 | 4 | count |
| | | 010 | 8 | count |
| | | 011 | 16 | count |
| | | 100 | 32 | count |
| | | 101 | 64 | count |
| | | 110 | 128 | count |
| | | 111 | 256 | count |

In an alternate embodiment, the low pass filter circuit 350 may swap locations with the high pass filter circuit 304 to form the hand pass frequency characteristic.

Figure 4:
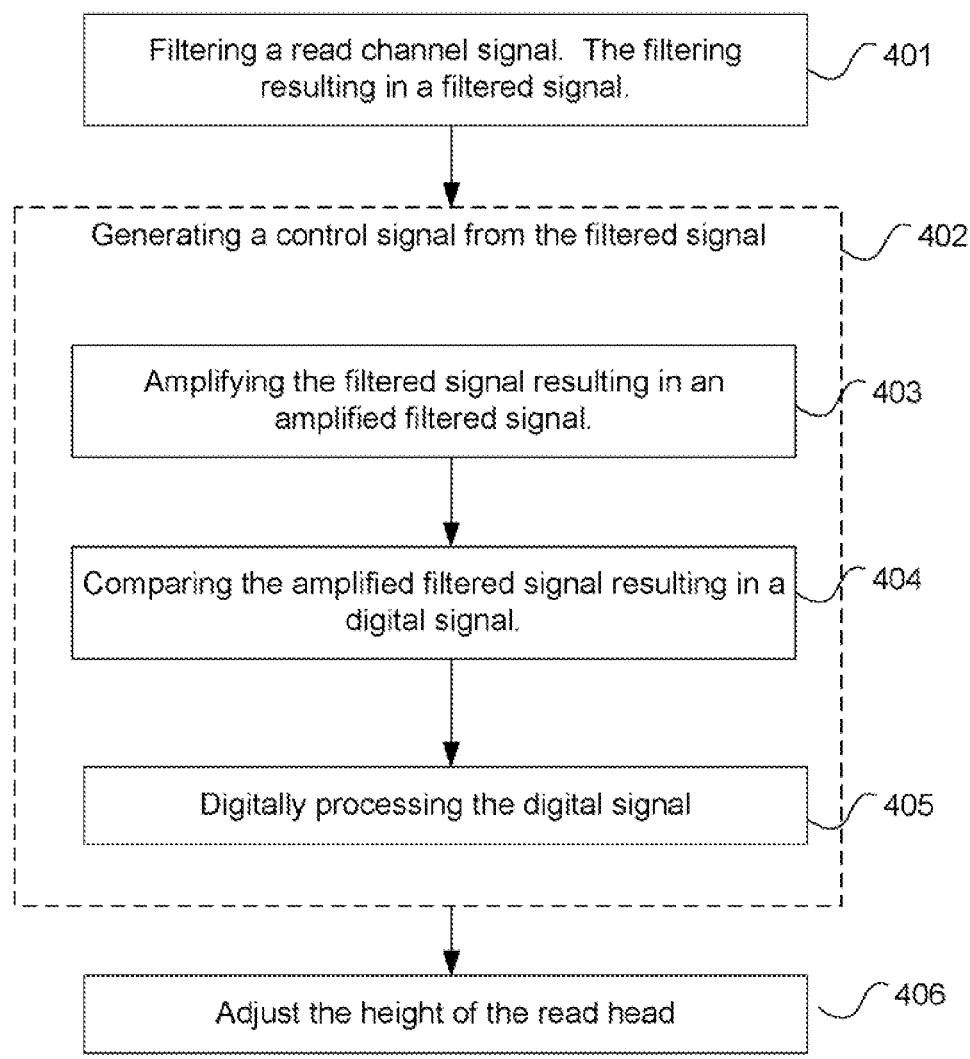
FIG. 4 illustrates a method of controlling a height of a read head of a disk drive according to one embodiment of the present invention.

FIG. 4 illustrates a method 400 of controlling a height of a read head of a disk drive according to one embodiment of the present invention. Method 400 includes filtering and generating a control signal to control the fly-height of the read head above the platter of a hard disk.

At 401, a read channel from a read head is filtered. The filtering 401 frequency ranges between 10 and 500 kHz. The step of filtering 401 results in a filtered signal.

At 402, a control signal is generated from the filtered signal. The step 402 includes substeps 403, 404 and 405.

At 403, the filtered signal is amplified. This results in an amplified filtered signal At 404 the amplified filtered signal is compared to a defined threshold. The defined threshold corresponds to the power generated at the read head corresponding to a touchdown event. This threshold may also take into account the attenuation of some circuitry in the processing of the read channel signal such as filtering, for example. The defined threshold may be programmed according to a signature of the read channel signal. A signature is a unique characteristic signal associated with a particular mechanical and electrical design of a hard drive. The comparing produces a digital signal.

At 405, the digital signal is digitally processed to produce a control signal. The control signal may be a digital indicator or a signal to set a hit in a control register. The digital processing includes diminishing portions of the digital signal which do not correspond to a touchdown of the read head on the platter. For example, during power up or shutdown the platter may change states and cause triggering of the comparing (404). The digital processing may be disabled during this period in order to not falsely indicate a touchdown of the read head on the platter. Also, there may be periodic triggering of the comparing (404), and the digital processing may require N triggers to occur in order to indicate that the read head has touched down on the platter of the hard drive (i.e. a touchdown event.

At 406, adjust the height of the read head to reduce the amount of touchdowns according to the control signal. The adjustment may be accomplished by the use of a heating element.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus including a circuit that generates control information, wherein the control information controls a height of a head relative to a platter of a disk drive, the circuit comprising:

a filter circuit that is configured to receive a read channel signal from the head and that is configured to generate a filtered signal based on the read channel signal, wherein the filtered signal ranges between 10 kHz and 500 kHz, wherein the filtered signal corresponds to a mechanical motion of the head, the mechanical motion resulting from a touchdown of the head on the platter; and a detector circuit that is configured to receive the filtered signal and that is configured to generate the control information when the filtered signal exceeds a defined threshold.

2. The circuit of claim 1 wherein the filter circuit includes a high pass filter circuit coupled in series with a low pass filter circuit, wherein the filter circuit passes a band of frequencies corresponding to an amplitude modulated signal of the read channel signal.

3. The circuit of claim 1 wherein the filter circuit is programmable and is programmed according to a signature of the read channel signal.

4. The circuit of claim 1 wherein the detector includes a programmable comparator which is programmed to set the defined threshold, wherein the programmable comparator receives the filtered signal and generates a digital signal corresponding to the defined threshold, wherein the defined threshold is programmed according to a signature of the read channel signal corresponding to a motion of a head slider suspension assembly.

5. The circuit of claim 4 wherein the detector includes a digital circuit that receives the digital signal and generates the control information,
wherein the digital circuit diminishes portions of the digital signal which do not correspond to the touchdown of the head.

6. The circuit of claim 5 wherein the detector includes a digital circuit that receives the digital signal and generates the control information,
wherein the digital circuit counts a number of transitions of the digital signal in order to determine the touchdown of the head.

7. A disk drive comprising:
a head;
a platter having a surface; and
a circuit that is configured to generate control information, wherein the control information controls a height between the head and the surface of the platter, the circuit comprising:
a filter circuit that is configured to receive a read channel signal from the head and that is configured to generate a filtered signal based on the read channel signal, wherein the filtered signal ranges between 10 kHz and 500 kHz, wherein the filtered signal corresponds to a mechanical motion of the head, the mechanical motion resulting from a touchdown of the head on the platter, and
a detector circuit that is configured to receive the filtered signal and that is configured to generate the control information when the filtered signal exceeds a defined threshold.

8. The system of claim 7 wherein the filter circuit includes a high pass filter circuit coupled in series with a low pass filter circuit,
wherein the filter circuit passes a band of frequencies corresponding to an amplitude modulated signal of the read channel signal.

9. The system of claim 7 wherein the filter circuit is programmable and is programmed according to a signature of the read channel signal when the touchdown occurs.

10. The system of claim 7 wherein the disk drive components further include a head slider suspension assembly,
wherein the detector includes a programmable comparator which is programmed to set the defined threshold,
wherein the programmable comparator receives the filtered signal and generates a digital signal corresponding to the defined threshold,
wherein the defined threshold is programmed according to a signature of the read channel signal corresponding to a motion of the head slider suspension assembly.

11. The system of claim 10 wherein the detector includes a digital circuit that receives the digital signal and generates the control information,
wherein the digital circuit diminishes portions of the digital signal which do not correspond to the touchdown of the head.

12. A method for controlling a height of a head relative to a platter of a disk drive, the method comprising:
filtering a read channel signal from the head, the filtering resulting in a filtered signal, wherein the filtered signal ranges between 10 kHz and 500 kHz, wherein the filtered signal corresponds to a mechanical motion of the head, the mechanical motion resulting from a touchdown of the head on the platter; and
generating control information when the filtered signal exceeds a defined threshold.

13. The method of claim 12 wherein the filtering includes high pass filtering in series with low pass filtering,
wherein the filtering passes a band of frequencies corresponding to an amplitude modulated signal of the read channel signal.

14. The method of claim 12 wherein the filtering is programmable and is programmed according to a signature of the read channel signal.

15. The method of claim 12 further comprising comparing the filtered signal according to the defined threshold, the comparing resulting in a digital signal,
wherein the defined threshold is programmed according to a signature of the read channel signal corresponding to a motion of a head slider suspension assembly.

16. The method of claim 15 wherein the generating the control information includes diminishing portions of the digital signal which do not correspond to the touchdown of the head.

17. The method of claim 12 further comprising adjusting the height of the head according to the control information.

18. The apparatus of claim 1, wherein the detector circuit is further configured to remove a false trigger of the filtered signal during one of power up, power down and initialization of the disk drive.

19. The apparatus of claim 1, wherein the detector circuit is further configured to be muted during a time period corresponding to one of power up, power down and initialization of the disk drive.

20. The apparatus of claim 1, wherein the detector circuit is further configured to perform a count of events that have been detected and to use the count to determine if the touchdown has occurred.

* * * * *